United States Patent [19]

Rideout

[11] 4,260,463

[45] Apr. 7, 1981

[54] REMOVAL OF ORGANIC CONTAMINANTS FROM WASTE WATER

[75] Inventor: Walker H. Rideout, Corpus Christi, Tex.

[73] Assignee: PPG Industries, Inc., Pittsburgh, Pa.

[21] Appl. No.: 77,464

[22] Filed: Sep. 20, 1979

[51] Int. Cl.³ .................. C25B 1/16; C25B 1/00; C02F 1/46

[52] U.S. Cl. ............................. 204/98; 204/128; 204/151

[58] Field of Search ................ 204/151, 128, 98

[56] References Cited

U.S. PATENT DOCUMENTS

| | | | |
|---|---|---|---|
| 2,997,430 | 8/1961 | Föyn | 204/151 |
| 3,562,137 | 2/1971 | Gehring | 204/151 X |
| 3,669,857 | 6/1972 | Kirham et al. | 204/151 |
| 3,703,453 | 9/1973 | Gordy et al. | 204/151 |
| 3,719,173 | 3/1973 | Lancy | 204/151 |
| 4,013,554 | 3/1977 | Reis et al. | 204/149 X |
| 4,045,314 | 8/1977 | Rod et al. | 204/151 |

Primary Examiner—Howard S. Williams
Assistant Examiner—D. R. Valentine
Attorney, Agent, or Firm—Robert J. Grassi; Edward J. Whitfield

[57] ABSTRACT

An aqueous alkaline waste stream containing chlorinated hydrocarbons is treated in an electrolytic diaphragm cell both to reduce the organics content of the waste stream as well as to recover chlorine and caustic values.

3 Claims, No Drawings

REMOVAL OF ORGANIC CONTAMINANTS FROM WASTE WATER

BACKGROUND OF THE INVENTION

Aqueous waste streams containing contaminating amounts of organic compounds are generated in a variety of industrial processes, for example, chlorinated hydrocarbon production processes. Before such aqueous wastes can be discharged to a receiving stream, the organics content must be substantially reduced in order to meet local, state and federal pollution standards.

For example, in the production of ethylene dichloride by catalytic vapor phase oxychlorination of ethylene, the gaseous reaction product stream is condensed to form an organic phase containing crude ethylene dichloride and an aqueous phase containing soluble organic contaminants chief among which are chloral and chloral hydrate. Although chloral and chloral hydrate may be decomposed to chloroform by, for example, treatment with sodium hydroxide as described in U.S. Pat. No. 3,378,597, chloroform as well as other organic contaminants, e.g., sodium formate and sodium acetate must be substantially removed before the waste stream can be safely discharged.

SUMMARY OF THE INVENTION

An aqueous alkaline waste stream containing chlorinated hyrdocarbons is treated in an electrolytic diaphragm cell both to reduce the organics content of the waste stream as well as to recover chlorine and caustic values.

DESCRIPTION OF THE INVENTION

In accordance with this invention, waste water containing organic compounds and inorganic alkali metal chloride salts is electrolyzed in an electrolytic cell to oxidize organic constituents to carbon dioxide thereby reducing the total organic carbon content of the waste water while recovering chlorine values as gaseous chlorine and alkali values as alkali metal hydroxide solution.

The electrolytic cell used in the practice of the process of the invention is a typical chlor-alkali cell of a type well-known to the art having an anode compartment provided with an anodic surface and a cathode compartment provided with a cathodic surface, said compartment separated by a diaphragm or a permionic membrane. The diaphragm may be of the Halar-asbestos type while the permionic membrane is comprised principally of a cation exchange resin formed into a thin sheet by, for example, fixing carboxylic acid as sulfonic acid group containing resins into a porous reinforcing matrix. Permionic membranes prepared from fluorinated polymers containing pendant side chains containing sulfonyl groups or fluorinated copolymers containing carboxylic acid groups are particularly well suited for use in the process of the invention.

The cathodic and anodic surfaces or electrodes of the cell are formed of electrically conducting materials such as, for example, graphite, carbon, nickel, cobalt, silver, steel, iron, platinum, tantalum, palladium, iridium, ruthenium and the like. Ruthenium oxide coated titanium has been used with success as the anode and mild steel has been satisfactorily used as the cathode.

In a typical practice of the invention, alkaline waste water containing chlorinated organics is charged to the anode compartment of the electrolytic cell, water or aqueous sodium hydroxide solution being charged to the cathode compartment. Although water alone may be used as the catholyte in start-up of the process, in order to enhance electrolysis of the water, to provide a more electrically conductive medium as well as to avoid excessively high voltages on cell start-up, it is preferred to charge the cathode compartment initially with aqueous sodium hydroxide solution, the concentration of which may vary over a considerable range, for example, from about 0.001 percent to 50 percent or more by weight.

The electrolytic cell may be operated over a wide range of current densities, for example, from about 50 to 300 amperes per square foot of apparent electrode surface, preferably from about 100 to 200 amperes per square foot. Likewise, the cell voltage may vary over a wide range, for example, from about 2 to 10 volts, typically from about 5 to 7 volts. The minimum operating voltage must be at least in excess of that required to obtain electrolysis of water, i.e. at least about 1.23 volts.

The electrode gap, i.e. the metal to metal distance between the anode and the cathode, should, of course, be as small as possible in order to obtain optimum voltage characteristics. Depending on cell configuration, width of the diaphragm or membrane, and the like, the electrode gap typically varies between 0.1 and 0.5 inch.

A constant direct current is applied to the cell and the organics in the anolyte are oxidized at the anode to carbon dioxide and chlorine gas which gases are vented from the cell and chlorine recovered therefrom by known techniques. Alkali metal ions migrate from the anolyte through the diaphragm or membrane and combine with hydroxyl ions in the catholyte formed upon decomposition of water at the cathode to form alkali metal hydroxide. The alkali metal hydroxide solution having a substantially reduced organic carbon content is withdrawn from the cathode compartment.

In order to make the waste water more amenable to electrolysis, the pH should be adjusted to at least about 8.5 by addition of alkali metal hydroxide, e.g., sodium hydroxide or potassium hydroxide, and sufficient alkali metal halide, e.g., sodium chloride or potassium chloride is preferably added such that the waste water contains at least 5 percent and preferably at least about 10 percent by weight alkali metal halide.

Since waste waters of the type amenable to treatment by the process of this invention often contain inorganic impurities such as aluminum silicate and silica, it is advisable to remove these materials prior to introducing the waste water to the cell to prevent plugging the pores of the diaphragm or membrane. Silica and aluminum silicate may be readily removed by, for example, pretreating the waste water with 32° Baume aluminum chloride solution at a pH in the range of 8.5 to 9.0 to precipitate silca and aluminum silicate, which is separated from the waste water by known techniques, for example, filtration, sedimentation, decantation, centrifugation and the like.

The invention thus provides means for not only reducing the total organic carbon content of waste water containing chlorinated hydrocarbon contaminants but also provides means of recovering chlorine as well as alkali values from the waste water. Although the invention has been described with particular reference to feeding only organics containing waste water to an electrolytic cell, it is also contemplated that the waste water be mixed directly with the brine feed to a conventional chlor-alkali cell, in which case it would not be necessary to either adjust the pH nor add any alkali metal chloride to the waste water, however, it would still be advisable to pretreat the waste water to reduce the content of silica and aluminum silicates as described hereinabove.

The invention is further illustrated but is not intended to be limited by the following example.

EXAMPLE

A two chambered cell was constructed of chlorinated polyvinyl chloride, the chambers being separated by a Halar-asbestos diaphragm. The diaphragm was prepared by vacuum deposition from a 10 wt-percent Halar/90 wt.-percent asbestos slurry onto a mild steel rolled mesh cathode, followed by baking at 109° C. for about 4 hours and at 265° C. for an additional hour. The diaphragm deposited on the rolled mesh cathode was about 0.38 lbs./ft$^2$, the cathode having a surface area of 0.083 ft$^2$. The anode used was ruthenium oxide coated titanium. The feed to the cell was stream stripped aqueous alkaline waste water obtained from a commercial ethylene oxyhydrochlorination plant. The aqueous waste water was pretreated with 0.5 milliliter per liter of 32° Baume aluminum chloride solution at a pH of 8.5 to 9.0 to precipitate aluminum silicate and silica which were removed by filtration.

The waste water was continuously fed to the anode compartment of the cell and the cell was continuously operated for 44 days at a current density of 189 to 192 amperes per square foot, an average voltage of 3.32 volts, with an electrode gap of 0.25 inches.

Feed, a cathode cell liquor and anode cell gas samples were periodically taken over the operating period and analyzed. The average results of these analyses are summarized as follows:

| Constituent | Feed | Cathode Cell Liquor | Anode Cell Gas |
|---|---|---|---|
| NaCl, wt-% | 15.24 | 4.3 | — |
| NaOH, wt-% | 0.34 | 8.7 | — |
| NaHCO$_3$, wt-% | 0.27 | 0 | — |
| Na$_2$CO$_3$, wt-% | 0.13 | 0.14 | — |
| NaClO$_3$, wt-% | 0 | 0.14 | — |
| NaC$_2$H$_3$O$_2$-wt-% | 0.04 | 0.01 | — |
| NaCHO$_2$, wt-% | 0.43 | 0 | — |
| H$_2$, -vol.% | — | — | 0.85 |
| O$_2$, vol.% | — | — | 7.62 |
| N$_2$, vol.% | — | — | 0.12 |
| CO$_2$, vol.% | — | — | 9.09 |
| CH$_3$Cl, vol.% | — | — | 0.002 |
| CH$_2$Cl$_2$, vol.% | — | — | 0.0001 |
| CHCl$_3$, vol.% | — | — | 0.0004 |
| Cl$_2$, vol.% | — | — | 82.32 |
| Total Organic Carbon Mg/L | 1297 | 44 | — |

As can be seen, treatment of waste water according to the invention results in a substantial reduction in total organic carbon content, i.e. about 97 percent while permitting recovery of chloride values as gaseous chlorine and alkali values as sodium hydroxide.

Although the invention has been described with specific references and specific details of embodiments thereof, it is to be understood that it is not intended to be so limited since changes and alterations therein may be made by those skilled in the art which are within the full intended scope of this invention as defined by the appended claims.

I claim:

1. A process for reducing the total organic carbon content of waste water containing organic compounds and alkali metal chlorides and recovering chloride and alkali values from the waste water comprising feeding the waste water to the anode compartment of an electrolytic cell, electrolyzing the waste water in the cell to oxidize organic constituents of the waste water to carbon dioxide and generate chlorine gas at the anode and withdrawing alkali metal hydroxide solution having a lower total organic compound content than that of the waste water fed to the anode compartment.

2. The process of claim 1 wherein the waste water has a pH of at least 8.5 and an alkali metal chloride content of at least 5 percent by weight.

3. The process of claim 1 wherein the waste water is electrolyzed at a current density of from 50 to 300 amperes per square foot and a voltage of from 2 to 10 volts.

* * * * *